United States Patent
Kanakasabai et al.

(10) Patent No.: US 9,831,717 B2
(45) Date of Patent: Nov. 28, 2017

(54) SYSTEMS AND METHODS FOR OPERATING UNINTERRUPTIBLE POWER SUPPLIES

(71) Applicant: General Electric Company, Schenectady, NY (US)

(72) Inventors: Viswanathan Kanakasabai, Bangalore (IN); Silvio Colombi, Losone (CH); Said Farouk Said El-Barbari, Munich (DE); Rajendra Naik, Bangalore (IN); Prashanth Manikumar Chennamsetty, Bangalore (IN)

(73) Assignee: General Electric Company, Schenectady, NY (US)

( * ) Notice: Subject to any disclaimer, the term of this patent is extended or adjusted under 35 U.S.C. 154(b) by 259 days.

(21) Appl. No.: 14/855,930

(22) Filed: Sep. 16, 2015

(65) Prior Publication Data
US 2017/0077746 A1    Mar. 16, 2017

(51) Int. Cl.
*H02J 1/00* (2006.01)
*H02J 9/06* (2006.01)
*H02J 7/00* (2006.01)

(52) U.S. Cl.
CPC ............. *H02J 9/061* (2013.01); *H02J 7/007* (2013.01); *H02J 7/0068* (2013.01)

(58) Field of Classification Search
CPC ........... H02J 9/061; H02J 7/0068; H02J 7/007
See application file for complete search history.

(56) References Cited

U.S. PATENT DOCUMENTS 5,781,422 A * 7/1998 Lavin ............... H02J 9/061
                                                           307/64
2012/0153721 A1    6/2012 Feddersen
(Continued)

FOREIGN PATENT DOCUMENTS

WO    2014011706 A1    1/2014
WO    2014026840 A2    2/2014
(Continued)

OTHER PUBLICATIONS

Roberts, B et al., "Commercial Successes in Power Storage", Power and Energy Magazine, IEEE Xplore, Mar.-Apr. 2005, vol. 3, Issue 2, pp. 24-30.
(Continued)

*Primary Examiner* — Daniel Cavallari
(74) *Attorney, Agent, or Firm* — General Electric Company

(57) ABSTRACT

An uninterruptible power supply (UPS) and methods of operation are provided. The UPS includes a transformer configured to receive power from a utility. The transformer includes a primary winding, a secondary winding, and a tertiary winding. The UPS also includes a rectifier coupled to the secondary winding and an inverter coupled to an output of the rectifier, wherein a connection between the rectifier and the inverter defines a DC link. The inverter is configured to output a first regulated voltage configured to be provided to a load. The UPS further includes a voltage-boost converter coupled to the tertiary winding and is configured to output a second regulated voltage to be combined with the first regulated voltage.

20 Claims, 5 Drawing Sheets

(56) References Cited

U.S. PATENT DOCUMENTS

2014/0062192 A1    3/2014    Vichnyakov
2014/0152109 A1    6/2014    Kanakasabai et al.

FOREIGN PATENT DOCUMENTS

WO    2014053464 A1    4/2014
WO    2014146776 A1    9/2014

OTHER PUBLICATIONS

Richard, T et al. "Power quality improvement case study of the connection of four 1.6 MVA flywheel dynamic UPS systems to a medium voltage distribution network", Transmission and Distribution Conference and Exposition, 2001 IEEE/PES, IEEE Xplore, Oct. 28-Nov. 2, 2001, vol. 1, pp. 253-258, Atlanta, GA.

* cited by examiner

SYSTEMS AND METHODS FOR OPERATING UNINTERRUPTIBLE POWER SUPPLIES

BACKGROUND

The field of the invention relates generally to uninterruptible power supplies, and more particularly, to multi-mode medium-voltage uninterruptible power supplies.

Uninterruptible power supplies (UPS) are used in many applications such as in data centers and hospitals to provide quality power to a load without interruption, including during outages or disturbances in the AC mains supply voltage. Typically, UPSs are rated to receive AC voltage from a low voltage (e.g. 380V-480V) distribution network and supply a three-phase voltage to the load. As the size of data centers increases, powering up critical loads through a low voltage UPS is a challenge as the current magnitude increases significantly, even reaching the limits of the low voltage switchgear. Processing the power at a higher voltage (e.g. 4.16 kV or 13.8 kV) causes the current to be handled by the UPS and the output cables to decrease. The voltage is then stepped down at the point of load. Accordingly, medium voltage conversion in the UPS (e.g. 4.16 kV or 13.8 kV) has advantages with respect to increased operating efficiency and reduced cabling cost.

BRIEF DESCRIPTION

In one aspect, an uninterruptible power supply (UPS) is provided. The UPS includes a transformer configured to receive input power. The transformer includes a primary winding, a secondary winding, and a tertiary winding. The UPS also includes a rectifier coupled to the secondary winding and an inverter coupled to an output of the rectifier, wherein a connection between the rectifier and the inverter defines a DC link. The inverter is configured to output a first regulated voltage. The UPS further includes a voltage-boost converter coupled to the tertiary winding and is configured to output a second regulated voltage that is added to the first regulated voltage.

In another aspect, a method of operating a power system is provided. The method includes coupling a UPS between a utility and a load. The UPS includes a transformer configured to receive input power, wherein the transformer includes a primary winding, a secondary winding, and a tertiary winding. The method also includes rectifying, using a rectifier coupled to the secondary winding, the input power to regulate a DC link voltage across a DC link defined by a connection between the rectifier and an inverter. The method further includes generating a first regulated voltage using the inverter coupled to an output of the rectifier, and generating a second regulated voltage that is added to the first regulated voltage. The second regulated voltage is generated using a voltage-boost converter coupled to the tertiary winding.

BRIEF DESCRIPTION OF THE DRAWINGS

FIG. 1B is a bottom portion of a schematic diagram of the exemplary power system shown in FIG. 1a.

DETAILED DESCRIPTION

Exemplary embodiments of an uninterruptible power supply (UPS) system and method for operating an uninterruptible power supply are presented. In particular, an uninterruptible power supply (UPS) is presented. Also, the UPS may be configured to receive a medium voltage from a utility, for example, an alternating current (AC) mains, and supply a medium voltage output to a load. In one example, the medium voltage at the AC mains may range from 3.3 kV to 20 kV.

Figure 1A:
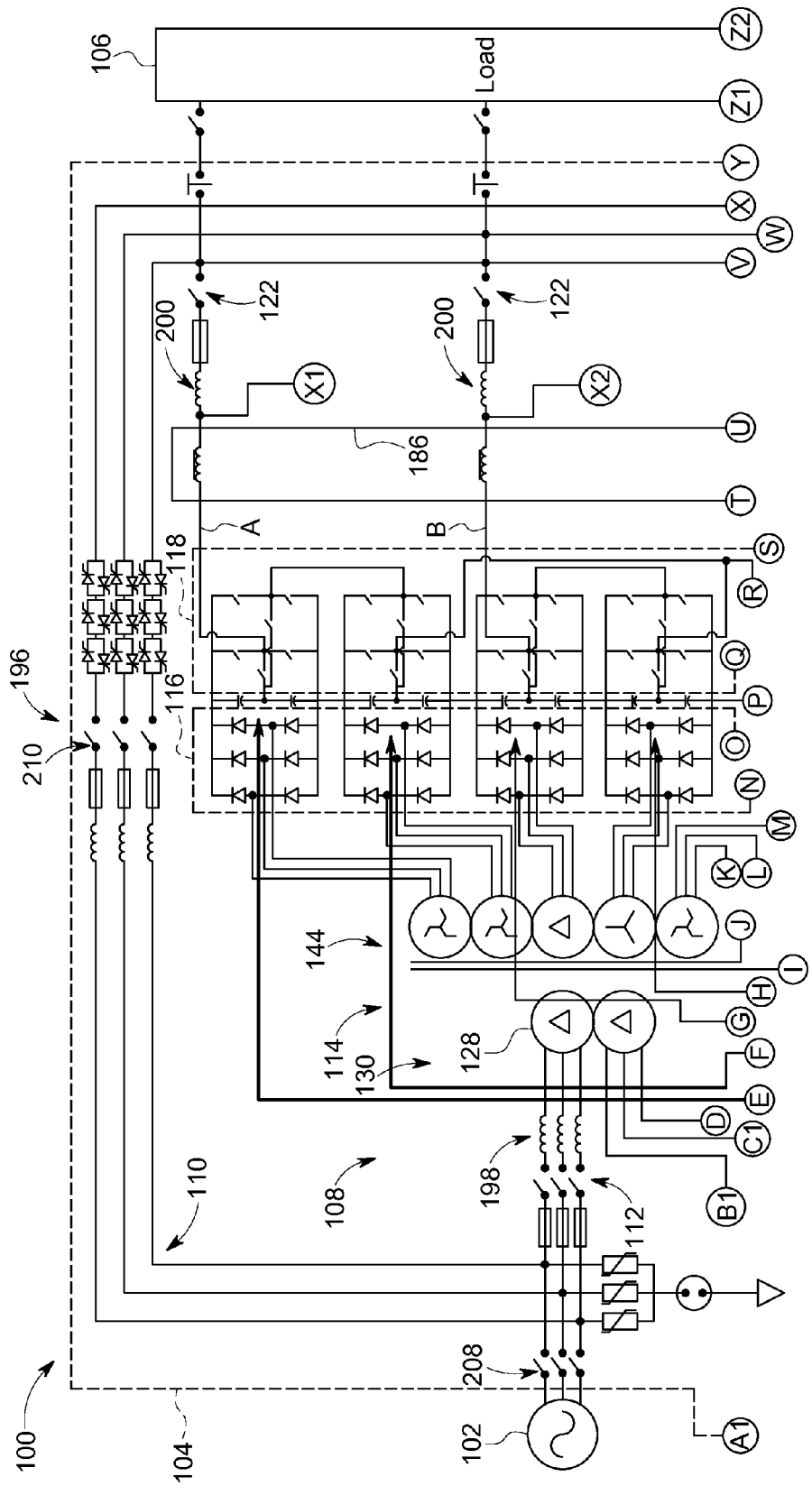
FIG. 1A is a top portion of a schematic diagram of an exemplary power system.
Figure 1B:
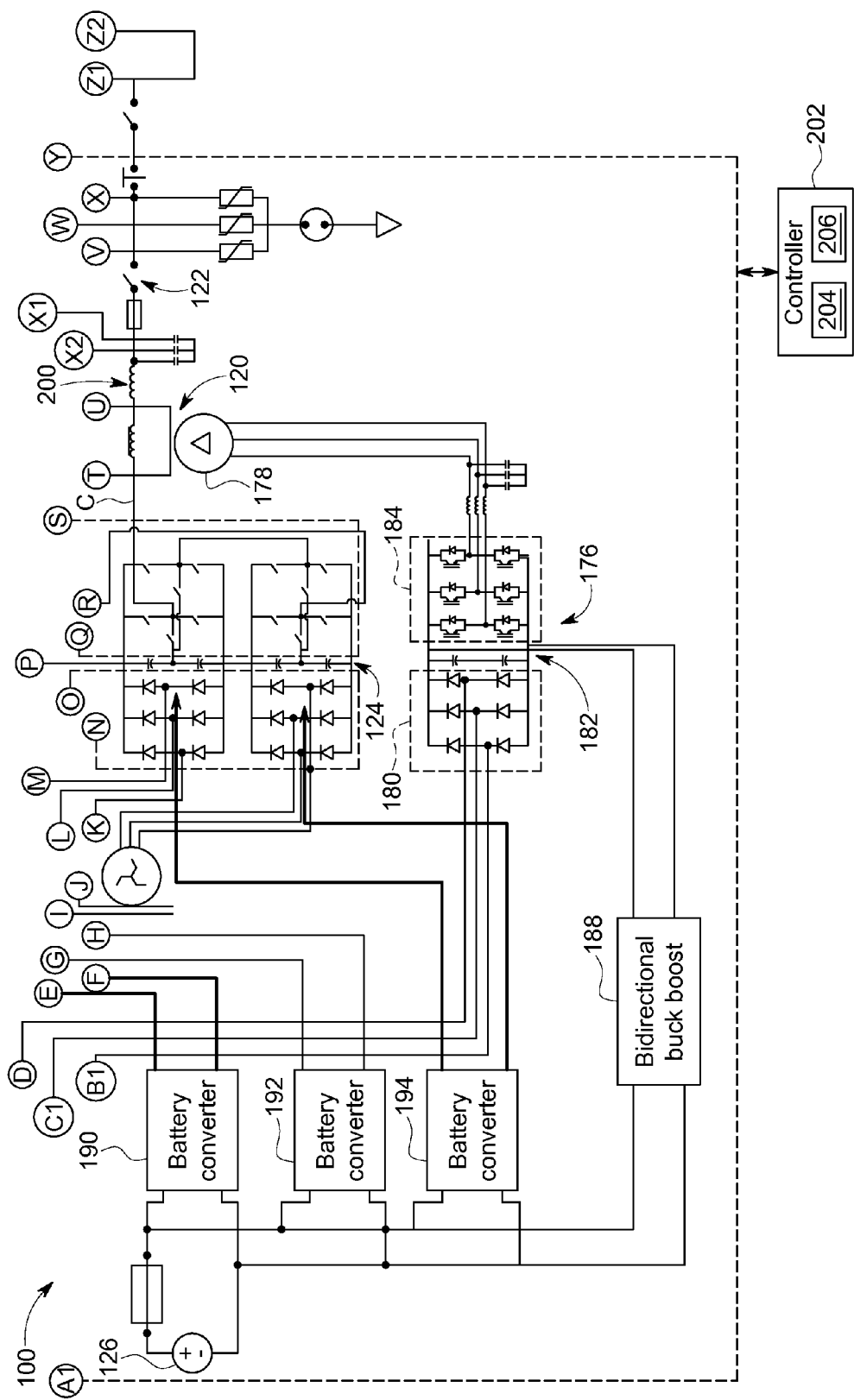
Figure 2A:
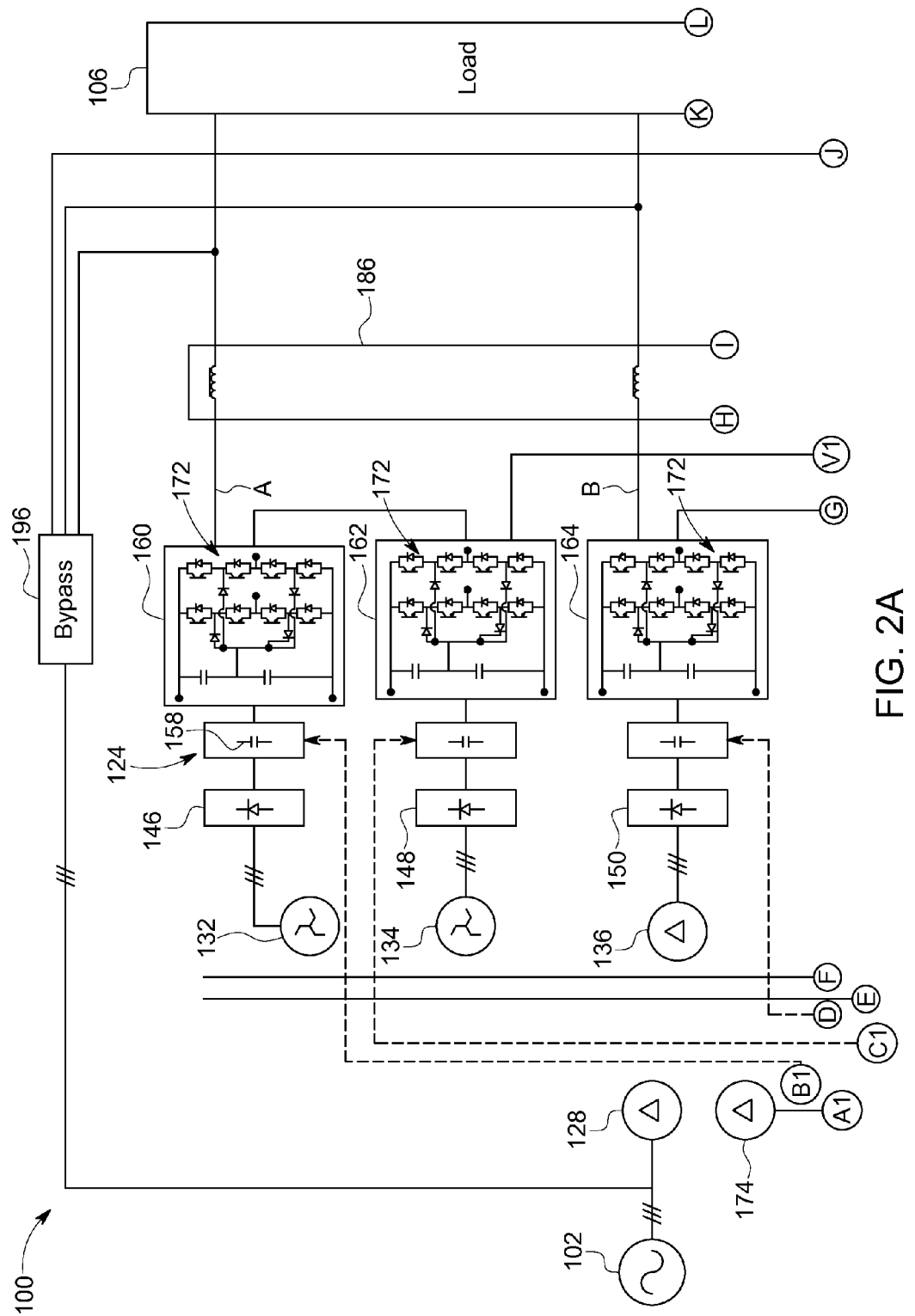
FIG. 2A is a top portion of a simplified block diagram of the exemplary power system shown in FIG. 1.
Figure 2B:
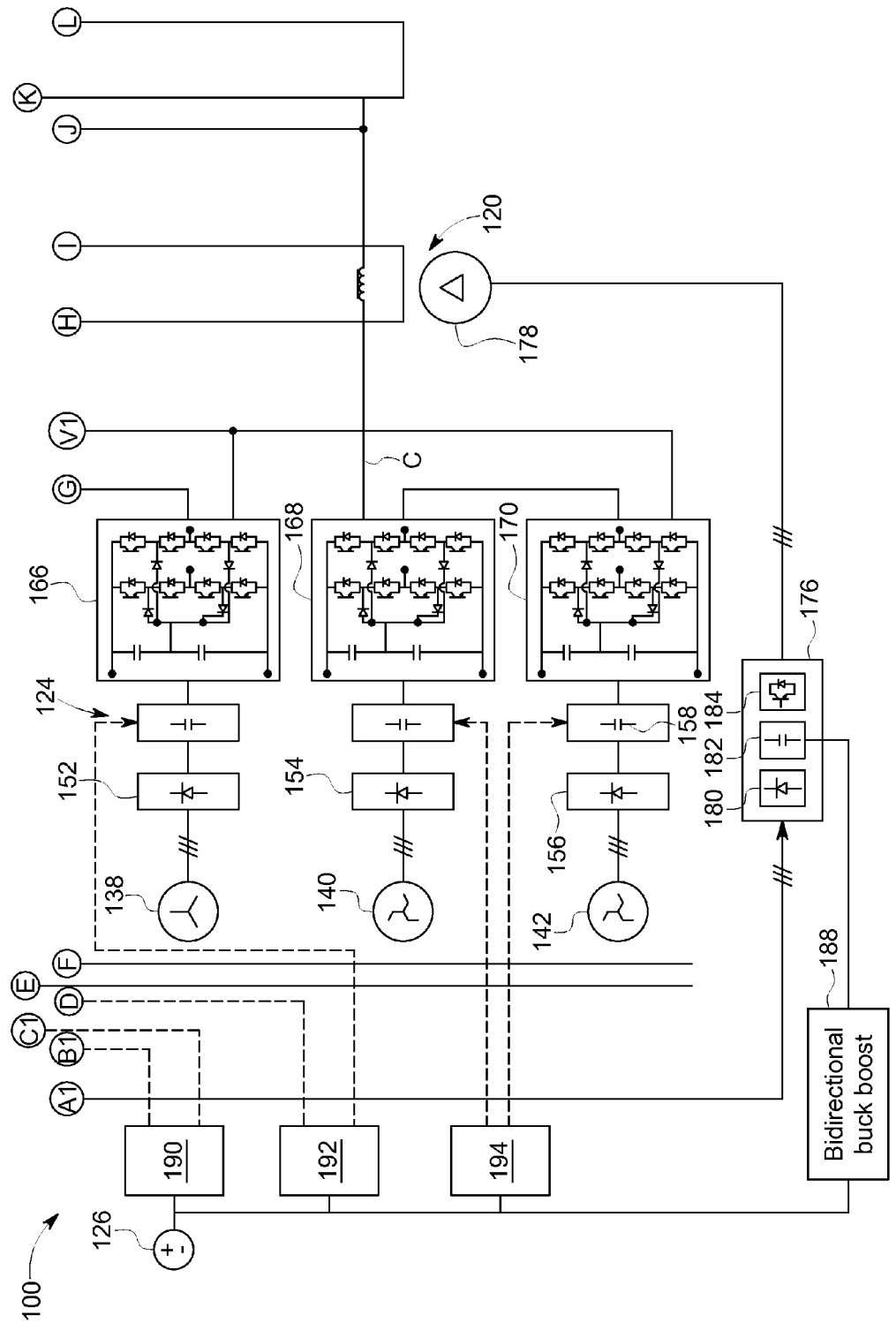
FIG. 2B is a bottom portion of the simplified block diagram of the exemplary power system shown in FIG. 1.

FIG. 1A is a top portion of a schematic diagram of an exemplary power system 100. FIG. 1B is a bottom portion of the schematic diagram of the exemplary power system shown in FIG. 1A. FIG. 2A is a top portion of a simplified block diagram of the exemplary power system shown in FIGS. 1A and 1B. FIG. 2B is a bottom portion of the simplified block diagram of the exemplary power system shown in FIGS. 1A and 1B. Referring to FIGS. 1A, 1B, 2A, and 2B, in the exemplary embodiment, power system 100 includes an AC mains, or utility 102, a medium voltage UPS 104, and at least one load 106. UPS 104 facilitates delivering power from utility 102 to load 106. In the exemplary embodiment, UPS 104 operates from a medium voltage (e.g. 13.8 kV) utility 102 and provides a well-regulated three-phase medium voltage to load 106. In the exemplary embodiment, system 100 includes one UPS 104. Alternatively, system 100 may include a plurality of UPSs 104 coupled in parallel.

UPS 104 includes a first, or double-conversion, path 108 in parallel with a second, or bypass, path 110. In the exemplary embodiment, first path 108 includes, in series, a first switch unit 112, a first transformer 114, an alternating current (AC) to direct current (DC) rectifier 116, a DC to AC inverter 118, a second transformer 120, and a second switch unit 122. In the exemplary embodiment, inverter 118 is a multi-level converter that includes series-connected three-level inverters in each phase. Alternatively, rectifier 116 and inverter 118 may be any converters that enable system 100 to function as described herein. Because UPS 104 includes rectifier 116 and inverter 118, UPS 104 may also be referred to as a double-conversion UPS.

In the exemplary embodiment, transformer 114 is configured to receive input power provided to UPS 104. Transformer 114 provides a step-down function and improves power quality of input voltage of the input power. Transformer 114 is upstream from a DC link 124 and a battery 126. Transformer 114 includes a primary, or delta, winding 128 on a primary side 130 and a secondary winding that includes six secondary windings 132, 134, 136, 138, 140, and 142 on a secondary side 144. The secondary windings are star, delta, or zig-zag windings and are configured to reduce the harmonic content in the current from utility 102. Star windings include three windings, each coupled at a first end to a different phase of a three phase power supply and at a second end to a neutral wire. Voltage between any one winding and another winding is the same for any combination of the windings, but voltage between any one winding and the neutral wire is different. Delta windings include three wires coupled to each other, and all having the same voltage. Zig-zag windings include three windings split in half, where each half is interconnected with a half-winding on another core limb. Zig-zag windings are used to suppress third harmonics or to provide a neutral connection as an earthing transformer, and to obtain a phase angle shift. In one embodiment, first, second, fifth, and sixth secondary windings 132, 134, 140, and 142 are zig-zag windings, third secondary winding 136 is a delta winding, and fourth secondary winding 138 is a star (wye) winding.

In the exemplary embodiment, rectifier 116 is coupled to the secondary winding of transformer 114. Rectifier 116 is 36-pulse rectifier that rectifies the AC input power to regulate a DC link voltage on a DC link 124. Rectifier 116 outputs the rectified AC voltage to inverter 118 via DC link 124. In the exemplary embodiment, DC link 124 is formed by the connection between rectifier 116 and inverter 118. Rectifier 116 may be either an active or a passive rectifier and may use diodes, IGBTs, thyristors, and/or a combination of devices. Rectifier 116 includes six three-phase rectifiers 146, 148, 150, 152, 154, and 156; one coupled to each of secondary windings 132, 134, 136, 138, 140, and 142. In the exemplary embodiment, rectifiers 146, 148, 150, 152, 154, and 156 are 3-phase diode bridge rectifiers. Alternatively, rectifiers 146, 148, 150, 152, 154, and 156 may be any rectifiers that enable system 100 to function as described herein.

In the exemplary embodiment, each DC link 124 includes DC link capacitors 158 that are charged by the rectified AC voltage generated by rectifier 116. DC link capacitors 158 provide smoothed DC voltage to inverter 118.

Inverter 118 is coupled to an output of rectifier 116 and is configured to output a first regulated voltage. More specifically, inverter 118 includes a cascaded set of neutral point clamped (NPC) inverters 160, 162, 164, 166, 168, and 170 that use the DC link voltages to generate a three phase AC voltage of relatively high magnitude (e.g. 11 kV). There are two inverter outputs for each of the three phases A, B, and C. The voltage outputs are coupled in series to combine the voltage outputs for each phase. Accordingly, the first regulated voltage is output from the NPC inverters. For example, outputs of inverters 160 and 162 are coupled to generate a phase A voltage, outputs of inverters 164 and 166 are coupled to generate a phase B voltage, and outputs of inverters 168 and 170 are coupled to generate a phase C voltage. Each of inverters 160, 162, 164, 166, 168, and 170 includes a plurality of switching units 172 that are operatively coupled in series. In the exemplary embodiment, each switching unit 172 includes at least two semiconductor switches.

Transformer 114 further includes a tertiary winding 174 that generates a three-phase voltage having a low magnitude (e.g. ~480 VAC). In the exemplary embodiment, tertiary winding 174 is a delta winding.

An AC-DC-AC voltage-boost converter 176 is coupled to tertiary winding 174 and generates a second regulated voltage that is fed to a primary winding 178 of second transformer 120 to be added to the first regulated voltage generated by inverter 118. In the exemplary embodiment, voltage-boost converter 176 includes a rectifier 180, a DC link 182 and an inverter 184. Rectifier 180 may be active or passive in nature. DC link 182 of voltage-boost converter 176 is defined by a conductor coupled between rectifier 180 and inverter 184.

Second transformer 120 has a delta/open-star configuration and includes a primary delta winding 178 and an open-star secondary winding 186. Primary delta winding 178 is coupled to the regulated three-phase output of voltage-boost converter 176. Open-star secondary winding 186 is coupled in series with each of phase voltage outputs A, B, and C of inverter 118. The series connection of second transformer 120 the output of inverter 118 enables UPS 104 to derive an appropriate output voltage for load 106 by adding the first regulated voltage generated by inverter 118 and the second regulated voltage generated by voltage-boost converter 176.

Battery 126 is electrically coupled to DC link 124. Battery 126 may be either a single battery or a set of batteries that may be grouped as a single battery bank or multiple battery banks. Battery 126 is typically rated for low voltages (e.g. 600 V max) and is configured to provide DC voltage to DC link 124 when utility 102 is interrupted or fails.

A bidirectional buck-boost converter 188 is coupled to DC link 182 of AC-DC-AC voltage-boost converter 176 and to battery 126. Bidirectional buck-boost converter 188 is configured to charge battery 126 when power from utility 102 is present. Additionally, bidirectional buck-boost converter 188 is configured to discharge battery 126 to regulate DC link voltage on DC link 126 of voltage-boost converter 176 when the input voltage is outside the predefined range First, second, and third battery converters 190, 192, and 194 electrically couple low-voltage battery 126 to medium-voltage DC link 124 formed by 36-pulse rectifier 116. Each battery converter 190, 192, and 194 is configured to regulate the DC link voltage on DC link 124 under a battery mode of operation. Each battery converter 190, 192, and 194 includes two outputs, one connected to the DC link 124 of the two inverters coupled in series at the output per phase. That is, battery converter 190 includes two isolated outputs, with a first output connected to DC link 124 of inverter 160 and a second output connected to DC link 124 of inverter 162, which outputs phase A voltage. Battery converter 192 includes a first output connected to DC link 124 of inverter 164 and a second output connected to DC link 124 of inverter 166, which outputs phase B voltage. Battery converter 194 includes a first output connected to DC link 124 of inverter 168 and a second output connected to DC link 124 of inverter 170, which outputs phase C voltage. Battery converters 190, 192, and 194 may be DC-DC converters or any other type of DC power conversion device that enables battery converters 190, 192, and 194 to function as described herein. Although described herein as having three battery converters, UPS 104 may use any other number of battery converters to regulate the voltage on DC link 124.

Second path 110 includes a bypass network 196 that, when activated, is configured to bypass inverter 118 and couple the input power from utility 102 directly to load 106. In the exemplary embodiment, bypass network 196 is realized using series-connected bidirectional conducting thyristors. Alternatively, bypass network 196 may be implemented using forced-commutation devices (e.g., an integrated gate-commutated thyristor (IGCT)) or any other device that enables system 100 to function as described herein.

In some embodiments, a first filter 198 (inductors and/or capacitors) is provided before first transformer 114 to reduce input current distortion and improve the power factor. A second filter 200, including inductors and shunt capacitors, is provided before load 106. Second filter 200 reduces switching harmonics at the load voltage. The leakage of transformer 120 may be used to provide the inductance of second filter 200.

A controller 202 is communicatively coupled to UPS 104 and controls operation of UPS 104, as described herein. More specifically, controller 202 is configured to apply a control method to inverter 118 and voltage-boost converter 176. Controller 202 may include its own power system (not shown) such as a dedicated energy source (e.g., a battery).

In some embodiments, controller 202 is coupled to a substitute controller (not shown) that may be used in the event that controller 202 fails.

In the exemplary embodiment, controller 202 is implemented by a processor 204 communicatively coupled to a memory device 206 for executing instructions. In some embodiments, executable instructions are stored in memory device 206. Alternatively, controller 202 may be implemented using any circuitry that enables controller 202 to control operation of UPS 104 as described herein. For example, controller 202 may dynamically determine what power resources will be needed and at what performance level, as well as environmental conditions (e.g., temperature, humidity, time of day, etc.) at which those power resources will need to operate. Controller 202 may perform dynamic monitoring to determine whether a load 106 is satisfied with the power delivered, and whether delivered power is free of harmonics, transients, etc. In some embodiments, dynamic monitoring may include tracking resource usage to determine how much current or voltage should be delivered. Controller 202 may also monitor and/or control rapidity (i.e., bandwidth) and inverter capability (e.g., overload, reactive power, active power) to facilitate ensuring reliability of system 100 and minimizing performance degradation of UPS 104.

Controller 202 may also include a state machine scheduler configured to selectively activate and deactivate power resources, set voltage and current levels, and/or take power saving actions (e.g., reducing current delivery). Controller 202 may also track characteristics (e.g., static allocation of power) of system 100 to determine whether one or more components of system 100 should be put on standby or whether power should be diverted.

In the exemplary embodiment, controller 202 performs one or more operations described herein by programming processor 204. For example, processor 204 may be programmed by encoding an operation as one or more executable instructions and by providing the executable instructions in memory device 206. Processor 204 may include one or more processing units (e.g., in a multi-core configuration). Further, processor 204 may be implemented using one or more heterogeneous processor systems in which a main processor is present with secondary processors on a single chip. As another illustrative example, processor 204 may be a symmetric multi-processor system containing multiple processors of the same type. Further, processor 204 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 204 causes controller 202 to operate UPS 104, as described herein.

In the exemplary embodiment, memory device 206 is one or more devices that enable information such as executable instructions and/or other data to be stored and retrieved. Memory device 206 may include one or more computer readable media, such as, without limitation, dynamic random access memory (DRAM), static random access memory (SRAM), a solid state disk, and/or a hard disk. Memory device 206 may be configured to store, without limitation, application source code, application object code, source code portions of interest, object code portions of interest, configuration data, execution events and/or any other type of data.

In normal mode of operation when the AC mains voltage is nominal, UPS 104 operates in a double conversion mode. During double conversion mode, rectifier 116 draws power from utility 102 and regulates the DC link voltages. Controller 202 controls switching units 172 of inverter 118 to produce a regulated 3-phase AC voltage at load 106 irrespective of the load nature (i.e., balanced/unbalanced linear/non-linear).

A turns ratio of transformer 114 is selected such that under the highest line conditions (e.g. 1.06 per unit (pu)), the maximum DC link voltage is such as to limit the device voltage stress to a maximum allowable limit. Under low-line conditions (e.g. 0.85 pu), the DC-link voltages created by rectifier 116 will be insufficient for inverter 118 to generate the full regulated AC voltage across load 106. Voltage-boost converter 176 generates a voltage that adds in-phase with the AC voltage generated by main inverter in order to regulate the load voltage to the desired value. More specifically, voltage-boost converter 176 boosts the AC voltage received from tertiary winding 174 and generates a regulated 3-phase AC voltage that is fed into second transformer 120. This regulated 3-phase AC voltage is added to and supplements the 3-phase AC voltage output by inverter 118.

In the exemplary embodiment, as the load voltage is contributed by inverter 118 and voltage-boost converter 176, there are several degrees of control freedom. In a first method of control, the contribution to the load voltage from the voltage-boost converter 176 is held constant irrespective of the line conditions, and inverter 118 is switched to regulate the load voltage in response to disturbances. More specifically, under low line conditions, controller 202 controls voltage-boost converter 176 to supply a set amount of AC voltage, and controls inverter 118 to supply whatever amount of AC voltage is needed after application of the set amount of AC voltage.

In a second method of control, controller 202 is configured to vary the voltage contribution from voltage-boost converter 176 such that a maximum contribution occurs under low-line conditions (e.g. 0.85 pu) and such that the contribution is minimal under high-line conditions (e.g. 1.06 pu). Additionally, controller 202 is configured to switch inverter 118 to regulate the load voltage in response to disturbances. That is, when AC input voltage supplied to rectifier 116 and inverter 118 is relatively low, voltage-boost converter 176 provides its largest voltage contribution to supplement inverter 118. As the AC input voltage supplied to rectifier 116 and inverter 118 progressively increases, the need for voltage contribution from voltage-boost converter 176 progressively decreases. Eventually, at relatively high-line conditions, when the input power is relatively high compared to the load power, the voltage contribution needed from voltage-boost converter 176 is minimal.

In a third method of control, controller 202 is configured to cause inverter 118 to provide a load voltage contribution based on an estimate of load power and line voltage, for example, using a feed-forward scheme that depends on an estimate of load voltage. Concurrently, controller 202 is also configured to regulate an output voltage of voltage-boost converter 176 based on load current feedback. Load current feedback may be obtained by, for example, positioning one or more current sensors at an output of UPS 104 to sense the output current being supplied to load 106. The current sensors transmit the load current information to controller 202. Because the control scheme for inverter 118 is based on estimations rather than measurements, it is known as a "rough" control regulation where control of the output voltage of inverter 118 may be less precise than with other methods. Alternatively, because voltage-boost converter 176 uses feedback measurements, it is known as a "tight" regulation that accurately controls the output voltage of voltage-boost converter 176 to ensure that UPS 104 provides a well-regulated output voltage to load 106.

In a fourth method of control, during a light load demand, controller 202 is configured to place voltage-boost converter 176 in a standby mode when inverter 118 contributes all of the power to load 106. A light load demand may occur when the load demand is small relative to an output capability of inverter 118 (i.e., load demand is 0%~30% of inverter capability). Because inverter 118 can easily supply a light load demand without supplemental supplied by voltage-boost converter 176, controller 202 commands voltage-boost converter 176 to enter the standby mode, which is a low power mode that enables voltage-boost converter 176 to remain powered on, but consume a fraction of the energy that it would in a normal operating mode. Placing voltage-boost converter 176 in the standby mode increases an operating efficiency of UPS 104.

In a fifth method of control, controller 202 is configured to control inverter 118 to switch at reduced frequencies to increase the efficiency of UPS 104, resulting in increased voltage fluctuations output by inverter 118. Controller 202 is further configured to control voltage-boost converter 176 to provide a correction voltage needed for UPS 104 to provide a sinusoidal output voltage.

Under the normal mode of operation, controller 202 controls the output voltage and frequency to be nearly equal to the AC mains voltage and frequency so that UPS 104 may be shifted to a bypass mode of operation for maintenance without affecting the load.

Moreover, during the normal mode, battery 126 is charged by bidirectional buck-boost converter 188, which receives energy from DC link 182 of voltage-boost converter 176. Power from mains 102 is sent down the primary side to voltage-boost converter 176 and then into bidirectional buck-boost converter 188.

In the exemplary embodiment, when the AC input voltage is outside a pre-defined range, UPS 104 shifts to a battery mode of operation. During battery mode, an AC mains breaker 208 is OFF. DC-DC converters 190, 192, and 194 operating from battery 126 are configured to regulate the DC link voltages when the input voltage is outside the pre-defined range. Bidirectional buck-boost converter 188, which was charging battery 126 in the normal mode of operation, now discharges battery 126 and regulates the DC link voltage of voltage boost converter 176 to a defined value. Inverter 118 and voltage boost converter 176 operate to regulate the load voltage without any interruption.

When inverter 118 and/or rectifier 116 fails or is under scheduled maintenance, controller 202 shifts UPS 104 to a bypass mode of operation. AC mains breaker 208 is turned ON. Bypass switch 210 (e.g., realized using semiconductor devices) is turned ON. Rectifier 116 and inverter 118 are switched OFF (no gate pulses) and a load isolator switch (typically a circuit breaker 122) is turned OFF. Accordingly, during bypass mode, load 106 is directly powered by utility 102.

Figure 3:
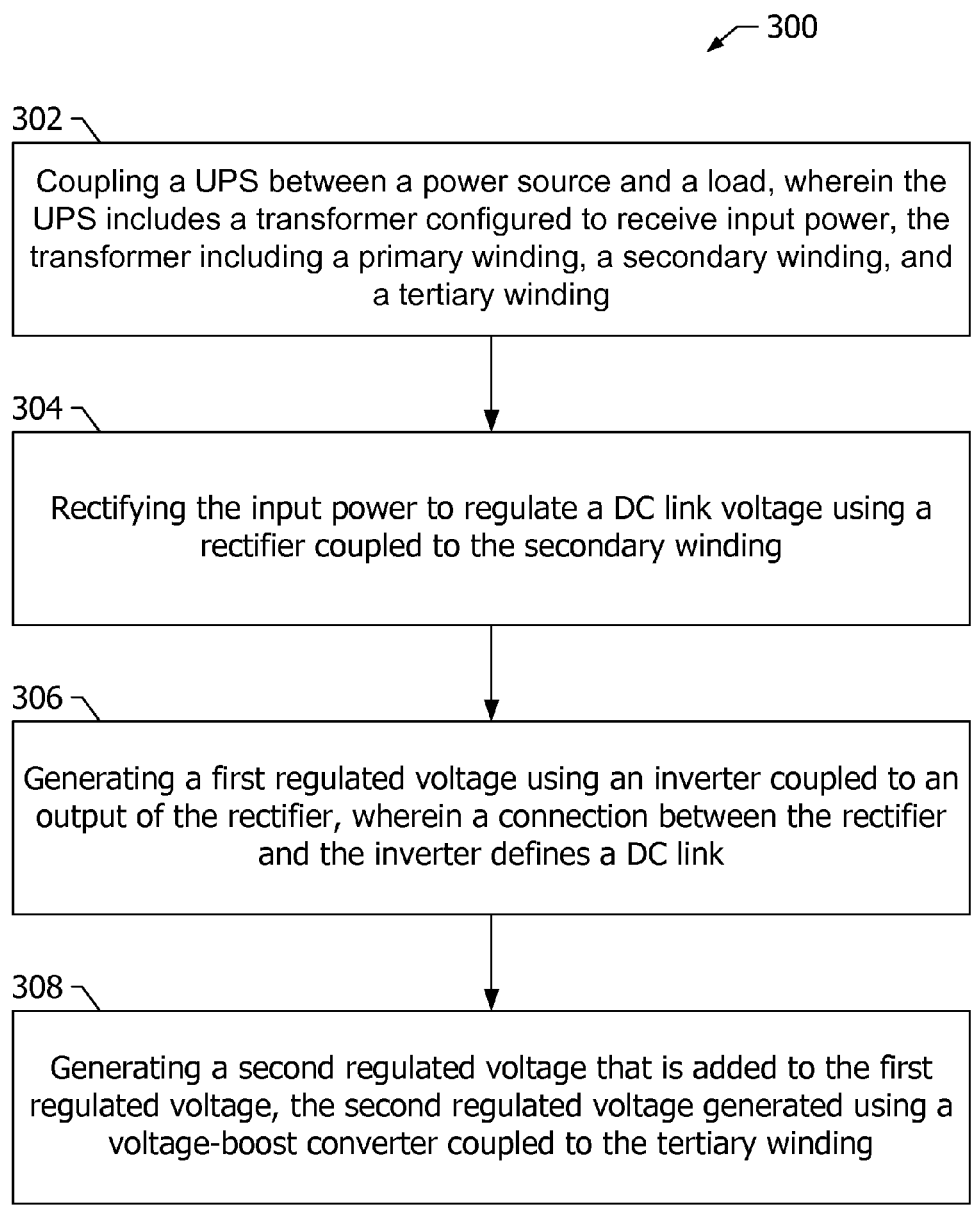
FIG. 3 is a flowchart of an exemplary method of operating the power system shown in FIG. 1.

FIG. 3 is a flowchart of an exemplary method 300 of operating power system 100 (shown in FIGS. 1A, 1B, 2A, and 2B). In the exemplary embodiment, method 300 includes coupling 302 a UPS 104 (shown in FIGS. 1A, 1B, 2A, and 2B) between power source 102 (shown in FIGS. 1A, 1B, 2A, and 2B) and load 106 (shown in FIGS. 1A, 1B, 2A, and 2B). UPS 104 includes a transformer 114 (shown in FIGS. 1A, 1B, 2A, and 2B) configured to receive input power. Transformer 114 includes a primary winding 130, a secondary winding 144, and a tertiary winding 174.

Method 300 also includes rectifying 304 the input power to regulate a DC link voltage using rectifier 116 coupled to secondary winding 144. Method 300 further includes generating 306 a first regulated voltage using inverter 118 coupled to an output of rectifier 116, wherein a connection between rectifier 116 and inverter 118 defines a DC link 124. Finally, method 300 includes generating 308 a second regulated voltage that is added to the first regulated voltage. The second regulated voltage is generated using voltage-boost converter 176 coupled to tertiary winding 174.

An exemplary technical effect of the methods and systems described herein includes at least one of: (a) coupling an uninterruptible power supply (UPS) between a power source and a load, wherein the UPS includes a transformer configured to receive input power, the transformer including a primary winding, a secondary winding, and a tertiary winding; (b) rectifying, using a rectifier coupled to the secondary winding, the input power to regulate a DC link voltage across a DC link defined by a connection between the rectifier and an inverter; (c) generating a first regulated voltage using the inverter coupled to an output of the rectifier; and; (d) generating a second regulated voltage that is added to the first regulated voltage, the second regulated voltage generated using a voltage-boost converter coupled to the tertiary winding.

The embodiments described herein provide connection and control of a UPS that operates from a medium voltage (e.g., 13.8 kV) grid and provides a well-regulated three-phase medium voltage to a load. At the voltage and power ratings that are considered, the UPS described herein avoids a full-power rated transformer at the load end and hence offers advantages in terms of low footprint and high operating efficiency. The UPS avoids series connection of converter devices and accordingly, avoids any issues related to sharing of voltages in series-connected devices. This increases the reliability of the converters. The disclosed UPS avoids over-voltages in the converters that stress the devices beyond their normal range. This configuration enables the use of lower voltage devices (e.g., 4500V device rating) with a minimum number (e.g., 2) of 3-level inverters coupled in series per phase. In addition, any interruptions in the load voltage even at low line conditions (e.g., 0.85 pu) and even in conditions when the AC mains is completely lost are avoided. The voltage-boost converter described herein not only helps in achieving the rated load voltage but also increases the power rating of the overall UPS.

Exemplary embodiments of systems and methods for uninterruptible power supplies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An uninterruptible power supply (UPS) comprising:
   a transformer configured to receive input power, said transformer comprising a primary winding, a secondary winding, and a tertiary winding;
   a rectifier coupled to said secondary winding;
   an inverter coupled to an output of said rectifier, wherein a connection between said rectifier and said inverter defines a DC link, said inverter configured to output a first regulated voltage; and
   a voltage-boost converter coupled to said tertiary winding and configured to output a second regulated voltage that is added to the first regulated voltage.

2. The UPS according to claim 1, further comprising a battery and a battery converter, said battery converter electrically coupled between said battery and the DC link.

3. The UPS according to claim 2, wherein said battery converter is configured to regulate voltage on the DC link when an input voltage of the input power is outside a predefined range.

4. The UPS according to claim 2, further comprising a bidirectional buck-boost converter coupled to a voltage-boost converter DC link and to said battery, the voltage-boost converter DC link defined by a conductor coupled between a voltage-boost converter rectifier and a voltage-boost converter inverter, said bidirectional buck-boost converter configured to:
   charge said battery when an input voltage of the input power is within a predefined range; and
   discharge said battery to regulate a DC link voltage of the voltage-boost converter DC link when the input voltage is outside the predefined range.

5. The UPS according to claim 1, further comprising a controller configured to apply a control method to said inverter and said voltage-boost converter.

6. The UPS according to claim 5, wherein said controller is configured to:
   set a load voltage contribution from said voltage-boost converter at a constant value irrespective of input line conditions; and
   switch said inverter to regulate the load voltage in response to disturbances.

7. The UPS according to claim 5, wherein said controller is configured to:
   vary a voltage contribution from said voltage-boost converter such that a maximum contribution occurs under low-line conditions and a minimum contribution occurs under high-line conditions; and
   switch said inverter to regulate the load voltage in response to disturbances.

8. The UPS according to claim 5, wherein said controller is configured to:
   cause said inverter to provide a load voltage contribution based on an estimate of load power and line voltage; and
   regulate an output voltage of said voltage-boost converter based on load current feedback.

9. The UPS according to claim 5, wherein during a light load demand, said controller is configured to place said voltage-boost converter in a standby mode when said inverter contributes all of the power to a load.

10. The UPS according to claim 5, wherein said controller is configured to:
    control said inverter to switch at low frequencies, resulting in large voltage steps; and
    control said voltage-boost converter to provide a correction voltage needed to provide a sinusoidal output voltage.

11. The UPS according to claim 1, further comprising a bypass network that when activated, is configured to bypass said inverter and couple the input power directly to a load.

12. A method of operating a power system, said method comprising:
    coupling an uninterruptible power supply (UPS) between a utility and a load, wherein the UPS includes a transformer configured to receive input power, the transformer including a primary winding, a secondary winding, and a tertiary winding;
    rectifying, using a rectifier coupled to the secondary winding, the input power to regulate a DC link voltage across a DC link defined by a connection between the rectifier and an inverter;
    generating a first regulated voltage using the inverter coupled to an output of the rectifier; and
    generating a second regulated voltage that is added to the first regulated voltage, the second regulated voltage generated using a voltage-boost converter coupled to the tertiary winding.

13. The method according to claim 12, further comprising regulating voltage on the DC link provided by a battery using a battery converter electrically coupled between the battery and the DC link when voltage is outside a predefined range.

14. The method according to claim 12, further comprising:
    charging the battery using a bidirectional buck-boost converter when an input voltage of the input power is within a predefined range, wherein the bidirectional buck-boost converter is coupled to a voltage-boost converter DC link and to the battery, wherein the voltage-boost converter DC link is defined by a conductor coupled between a voltage-boost converter rectifier and a voltage-boost converter inverter; and
    discharging the battery to regulate a DC link voltage of the voltage-boost converter DC link when the input voltage is outside the predefined range.

15. The method according to claim 12, further comprising:
    setting a load voltage contribution from the voltage-boost converter at a constant value irrespective of input line conditions; and
    switching the inverter to regulate the load voltage in response to disturbances.

16. The method according to claim 12, further comprising:
varying a voltage contribution from the voltage-boost converter such that a maximum contribution occurs under low-line conditions and the voltage contribution is minimal under high-line conditions; and
switching the inverter to regulate the load voltage in response to disturbances.

17. The method according to claim 12, further comprising:
causing the inverter to provide a load voltage contribution based on an estimate of load power and line voltage; and
regulating an output voltage of the voltage-boost converter based on load current feedback.

18. The method according to claim 12, further comprising placing the voltage-boost converter in a standby mode when the inverter contributes all of the power needed to supply the load.

19. The method according to claim 12, further comprising:
controlling the inverter to switch at low frequencies, resulting in large voltage steps; and
controlling the voltage-boost converter to provide a correction voltage needed to provide a sinusoidal output voltage.

20. The method according to claim 12, further comprising bypassing the inverter and coupling the received input voltage directly to the load when at least one of the rectifier fails, the inverter fails, and the load has a fault causing a fuse on the load side to open.

* * * * *